(12) United States Patent
Glinka (10) Patent No.: US 10,836,265 B2
(45) Date of Patent: Nov. 17, 2020

(54) VEHICLE HAVING A BRAKE DEVICE (71) Applicant: SIEMENS MOBILITY GMBH, Munich (DE)

(72) Inventor: Martin Glinka, Uttenreuth (DE)

(73) Assignee: Siemens Mobility GmbH, Munich (DE)

(*) Notice: Subject to any disclaimer, the term of this patent is extended or adjusted under 35 U.S.C. 154(b) by 189 days.

(21) Appl. No.: 16/067,743

(22) PCT Filed: Nov. 30, 2016

(86) PCT No.: PCT/EP2016/079181
§ 371 (c)(1),
(2) Date: Jul. 2, 2018

(87) PCT Pub. No.: WO2017/114616
PCT Pub. Date: Jul. 6, 2017

(65) Prior Publication Data
US 2019/0023151 A1 Jan. 24, 2019

(30) Foreign Application Priority Data
Dec. 30, 2015 (DE) .................. 10 2015 226 831

(51) Int. Cl.
*B60T 17/22* (2006.01)
*B60L 15/20* (2006.01)
(Continued)

(52) U.S. Cl.
CPC ............ *B60L 15/2009* (2013.01); *B60L 7/24* (2013.01); *B60T 1/10* (2013.01); *B60T 13/586* (2013.01); *B60T 17/228* (2013.01); *B60W 30/18127* (2013.01); *B61H 9/06* (2013.01); *F16D 61/00* (2013.01); *H02P 3/26* (2013.01); *B60L 2200/26* (2013.01); *F16D 2200/0039* (2013.01);
(Continued)

(58) Field of Classification Search
CPC .... B60L 15/2009; B60L 7/24; B60L 2200/26; B60T 1/10; B60T 13/586; B60T 17/228; B61H 9/06; B60W 30/18127; F16D 61/00; F16D 2200/0039; F16D 2200/0052; H02P 3/26
See application file for complete search history.

(56) References Cited

U.S. PATENT DOCUMENTS 5,614,796 A * 3/1997 Minderlein ............... B60L 3/00
                                                               318/376
5,806,636 A    9/1998 Atmur et al.
(Continued)

FOREIGN PATENT DOCUMENTS

CN    103381798 A    11/2013
DE    102006057065 A1    6/2008
(Continued)

*Primary Examiner* — Thomas W Irvin
(74) *Attorney, Agent, or Firm* — Laurence Greenberg; Werner Stemer; Ralph Locher (57) ABSTRACT A vehicle has a brake device with a friction brake unit, an electrical brake unit and a brake control device. In order to provide a vehicle having a reliable and structurally simple brake device, the friction brake unit has brake components made of a composite material and the brake control device includes a monitoring device for monitoring a brake operation performed by the electrical brake unit.

16 Claims, 5 Drawing Sheets (51) Int. Cl.
  *B60T 1/10* (2006.01)
  *B60L 7/24* (2006.01)
  *B61H 9/06* (2006.01)
  *B60T 13/58* (2006.01)
  *B60W 30/18* (2012.01)
  *F16D 61/00* (2006.01)
  *H02P 3/26* (2006.01)

(52) U.S. Cl.
  CPC ..... *F16D 2200/0052* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 6,456,909 | B1 | 9/2002 | Shimada et al. |
| 8,143,734 | B2 * | 3/2012 | Steudel ................ F03D 7/0224 290/43 |
| 8,962,083 | B2 * | 2/2015 | Murphy .............. C04B 35/6269 427/294 |
| 9,522,667 | B2 * | 12/2016 | Herden .................. B60T 17/22 |
| 9,533,668 | B2 * | 1/2017 | Foerster ................ B60T 17/228 |
| 9,707,951 | B2 | 7/2017 | Foerster et al. |
| 10,112,633 | B2 | 10/2018 | Wiesand |
| 2006/0017414 | A1 * | 1/2006 | Joe ........................ B60K 6/445 318/432 |
| 2008/0199681 | A1 * | 8/2008 | Murphy .............. C04B 35/6269 428/312.8 |
| 2008/0288147 | A1 * | 11/2008 | Cesario .................. B60T 8/174 701/70 |
| 2009/0224706 | A1 * | 9/2009 | Jobard .................. B60L 3/0076 318/380 |
| 2010/0241330 | A1 | 9/2010 | Hartmann et al. |
| 2011/0311753 | A1 * | 12/2011 | Faria ...................... C04B 35/52 428/66.2 |
| 2013/0192933 | A1 | 8/2013 | King et al. |
| 2014/0229058 | A1 | 8/2014 | Herder et al. |
| 2015/0032302 | A1 | 1/2015 | Foerster et al. |
| 2015/0081145 | A1 * | 3/2015 | Forster ................ B60T 17/228 701/19 |

FOREIGN PATENT DOCUMENTS

| | | |
|---|---|---|
| DE | 102009051019 A1 | 5/2011 |
| DE | 102011113086 A1 | 3/2013 |
| DE | 102012203132 A1 | 8/2013 |
| DE | 102013201389 A1 | 8/2013 |
| KR | 1020100035705 A | 4/2010 |
| RU | 2192974 C2 | 11/2002 |
| RU | 116413 U1 | 5/2012 |
| WO | 9738235 A1 | 10/1997 |
| WO | 2015091955 A1 | 6/2015 |

* cited by examiner

VEHICLE HAVING A BRAKE DEVICE

BACKGROUND OF THE INVENTION

Field of the Invention

The invention relates to a vehicle having a braking device, which has at least one friction brake unit, an electrical brake unit, and a brake control device.

Vehicles are known in which a braking force is generated by electric motors. The kinetic energy of the vehicle regeneratively converted into electrical energy during braking of the motors is converted, for example via a braking resistor, into heat or is returned into the railway supply network or into a mobile storage facility.

In addition to the electrodynamic, regenerative brake, the vehicles conventionally continue to have a full-fledged friction brake in which the braking effect is achieved by pneumatic, hydraulic and/or mechanical means.

SUMMARY OF THE INVENTION

The invention is based on the object of providing a vehicle with a reliable and structurally simple braking device.

For this purpose, a vehicle with a braking device is provided, which has at least one friction brake unit, an electrical brake unit, and a brake control device, wherein the friction brake unit has at least brake components made of a composite material and the brake control device comprises a monitoring device, which is provided for monitoring a braking operation performed by the electrical brake unit. As a result, an advantageous weight reduction can be achieved with an at least unchanged level of reliability of the braking device compared to conventional braking devices for vehicles. The invention is based on the consideration that with a targeted use of the electrical brake unit as a priority relative to the friction brake unit, an advantageous relief thereof can be achieved. Thanks to the monitoring device, a high level of reliability can be achieved in the use of the electrical brake unit, so it can also be used as a priority with respect to the friction brake unit to carry out safety braking—in particular in the worst case of emergency braking starting from the maximum permitted speed of the vehicle and/or on a downhill stretch. The number of cases that can occur during the life of the braking components of the friction brake unit and in which such emergency braking must be predominantly or completely performed by the friction brake unit, can therefore be kept low. As a result, a long service life of the friction brake unit can be achieved. The invention is based on the further consideration that a brake component made of a composite material is quite capable of being operated undamaged in a high temperature range—typically at temperatures above 800° C. Although these temperatures are well above the typical temperatures at which oxidation of conventional, commercially available composite materials and disadvantages associated therewith occur, such exceeding of these critical oxidation limit temperatures is less critical in these only rare applications of emergency braking without the participation of the electrical brake unit. The high reliability of the electrical brake unit means the friction brake unit can be relaxed to the extent that it does not exceed the appropriate oxidation limit temperature in most braking cases—also called "service braking operations". Therefore, commercially available, lightweight composite materials designed for average operating temperatures below 550° C. can be used for the design of a reliable braking device.

The braking components of the friction brake unit made of a composite material are, in particular, brake discs. Brake linings made of organic or ceramic materials can thereby be used in combination with these brake discs.

A "composite material" is a material made of at least two connected materials, which have different material properties to its individual components. For use in brake components, in particular fiber-reinforced composites are advantageous, which have an embedding matrix made of a first material and reinforcing fibers made of a second material. The use of a carbon fiber composite has the advantage, moreover, of high mechanical strength.

Monitoring of a braking operation performed by the electrical brake unit is expediently based on the detection of at least a braking effect characteristic. A "braking effect characteristic" should in particular be taken to mean a characteristic by which at least one item of information about a braking effect of the electrical brake unit can be obtained. This braking effect can be a braking effect achieved by the electrical brake unit or a braking effect that can be achieved by operation of a brake control unit for control thereof. In the first alternative, the monitoring device can comprise a sensor unit by which at least one operating characteristic related to the vehicle, such as, for example a momentary speed characteristic, an instantaneous acceleration characteristic, a braking force characteristic, etc. can be detected. A "braking effect" can in particular be taken to mean a braking force or a braking torque, either of which can be transmitted to at least one vehicle wheel unit, in particular a vehicle wheel set, or a braking power.

Monitoring of a braking operation performed by the electrical brake unit preferably comprises at least monitoring of a brake control unit, which is provided for controlling the electrical brake unit when performing the braking operation. In this case, the monitoring device can evaluate control signals generated by an active brake control unit for controlling the electrical brake unit in order to determine a braking effect achievable with the control signals.

The brake control device expediently has at least one brake control unit for controlling the electrical brake unit and at least one brake control unit for controlling the friction brake unit. These braking units are preferably different from each other in terms of software and/or hardware.

The monitoring device expediently has at least one monitoring unit for monitoring a brake control unit associated with the electrical brake unit, with the monitoring unit and the brake control unit being two units different from each other, in particular separate from each other.

An "electrical brake unit" should in particular be taken to mean a brake unit in which, during a baking operation, at least part of the kinetic energy of the vehicle is converted into electrical energy. For example, the electrical brake unit can have an eddy current brake.

In an advantageous development of the invention, the vehicle can have a storage unit in which at least some of the electrical energy generated during the braking operation by the electrical brake unit is stored and which has at least one battery and/or at least one double layer capacitor.

In a particularly preferred embodiment of the invention, it is proposed that the electrical brake unit has at least one drive unit of the drive device of the vehicle. The drive unit typically has at least one drive motor mechanically coupled to a driving wheel unit of the vehicle and a power supply unit, which is provided in a traction mode of the vehicle for generating an electrical power for the drive motor. During a braking operation of the electrical brake unit, the power supply unit or its controllable electronic power elements are expediently controlled by an associated brake control unit in such a way that a braking torque transmittable to a drive wheel unit of the vehicle is generated by the drive motor operatively connected to the power supply unit. Monitoring of a braking operation performed by the electrical brake unit preferably comprises monitoring the drive motor, a power supply unit associated therewith and/or the associated brake control unit for controlling the power supply unit.

In an advantageous embodiment, a driving wheel unit of the vehicle can have a wheelset axle to which vehicle wheels are coupled. The driving wheel unit can correspond to a drive axle of the vehicle.

In an alternative embodiment, driving wheel units of the vehicle can be independent, in each case drivable vehicle wheels. In this context it is advantageous if at least one of the brake components of the friction brake unit and a drive unit of the drive device are each associated with a plurality of vehicle wheels, with the drive unit being part of the electrical brake unit. In this case, this drive unit can comprise a wheel hub drive.

In a normal braking mode of the braking device, the brake control device is expediently provided to perform a braking operation with the electrical brake unit as a priority. This should be taken to mean that the majority of the braking effect to be achieved during the braking operation should as far as possible be generated by the electrical brake unit. A target braking effect is required by a vehicle driver, by a vehicle controller and/or by an emergency braking device of the vehicle. In the normal braking mode, the friction brake unit advantageously serves to support the electrical brake unit.

In addition, it is proposed that the brake control device is provided to activate a safety mode of the friction brake unit with a limitation of the electrical brake unit detected by the monitoring device. A high level of reliability can be achieved hereby. A limitation of the electrical brake unit can be caused by a fault in operable components of the electrical brake unit and/or a brake control unit provided for controlling these components. If, as suggested above, the electrical brake unit is formed of at least one drive unit of a drive device of the vehicle, a limitation due to a fault in a drive component of the drive unit can result. This can be a fault in a drive motor and/or power supply unit associated therewith. Moreover, the fault can be caused by a brake control unit provided for controlling this power supply unit. A "limitation" of the electrical brake unit can be a partial failure in which the electrical brake unit can generate a smaller braking effect than a braking effect that can be generated in a fault-free case, or can be a total failure. The safety mode expediently comprises at least the compensation of a braking effect that is insufficient owing to the limitation or the generation of the braking effect that can be generated by the electrical brake unit in the normal case. The safety mode can in particular comprise the execution of emergency braking.

According to one variant of the invention, a particularly high level of reliability can be achieved if the brake control device has at least two brake control units for controlling the electrical brake unit, which are redundant to each other or diversely redundant. Two units are regarded as "diversely redundant" if a unit for a fallback strategy is used in the case of a fault in the other unit and the units are based on different technologies in terms of construction and/or software.

Alternatively or in addition, it is proposed that the brake control device has at least two brake control units for controlling the electrical brake unit and the monitoring device comprises at least two different monitoring units, which are different from each other and are each associated with a different brake control unit. As a result, operation that is particularly gentle on the friction brake unit can be achieved. The number of cases that can occur during the life of the braking components of the friction brake unit and in which emergency braking needs to be predominantly or completely performed by the friction brake unit, can in fact be further reduced as a result.

Furthermore, to further increase reliability it is proposed that the brake control device is provided to control the friction brake unit for a braking effect compensation with a braking effect of the electrical brake unit that is insufficient with respect to a desired braking effect and detected by monitoring device. The difference in the braking effect provided, or which can be provided, by the electrical brake unit from the desired braking effect can be particularly advantageously compensated by the braking effect compensation by the friction braking unit.

In an advantageous embodiment of the invention, it is proposed that the composite material is a ceramic composite material. A ceramic material should be taken to mean a material whose chemical composition includes silicon carbide (SiC). This material is advantageously suitable for high temperature applications. In particular, a thermal load of over 800° C., in particular over 1,000° C., can be achieved. A brake component produced by this material is advantageously more compact and lighter than a conventional brake component made of cast steel or cast iron.

In particular, it is proposed that the composite material has an oxidation limit temperature in the range of 300 to 500° C. An inexpensive friction brake unit that can be produced with commercially available elements can be achieved hereby.

Particularly advantageously, the composite material is designed for damage-free operation up to temperatures in the range of 800 to 1,400° C., in particular in the range of 800 to 1,300° C. A friction brake unit can be achieved hereby, which—despite an overload mode above an oxidation limit temperature—is suitable for performing reliable emergency braking of the vehicle in an unfavorable speed and/or gradient situation. The term "damage-free" operation of the braking components should be taken to mean an operating phase with which—apart from aging effects—no significant damage to further operation of the brake component is associated.

The vehicle can be designed in particular as a motor vehicle, which for example is designed for road transport without being bound to rails. In particular, the vehicle can be designed as a passenger vehicle (car), bus or truck.

The invention is suitable in particular for a rail vehicle designed for transporting passengers. In a particularly advantageous embodiment, the rail vehicle is suitable for high-speed transport, with a maximum operating speed of at least 350 km/h.

BRIEF DESCRIPTION OF THE SEVERAL VIEWS OF THE DRAWING

Exemplary embodiments of the invention will be described in more detail with reference to the drawings, in which.

DESCRIPTION OF THE INVENTION

Figure 1:
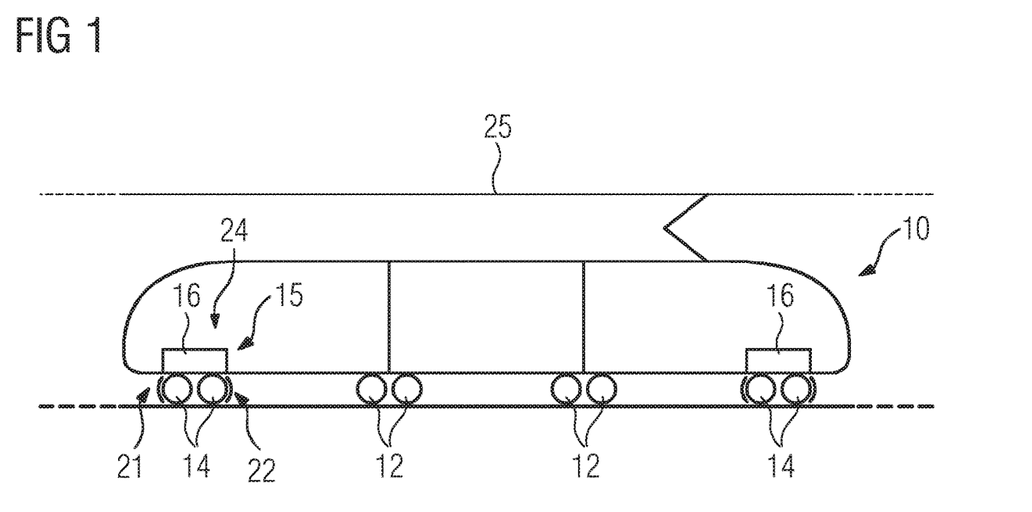
FIG. 1 shows a rail vehicle in a schematic side view, with a drive device and a braking device.

FIG. 1 shows a rail vehicle 10 designed as a multiple unit in a highly diagrammatic side view. It has running axles 12 and drive wheel units designed as drive axles 14, which are driven in a traction mode by a drive device 15. The drive axles 14 are mounted in motor bogie devices, in particular power trucks. The rail vehicle 10 is designed for high-speed transport and has a maximum permitted speed in passenger service of 350 km/h.

In the embodiment shown as a multiple unit, the rail vehicle 10 corresponds to a group of cars, which are each designed for transporting passengers, with at least one of the cars being designed as a rail car with drive axles 14. In an alternative embodiment, the rail vehicle can be designed as a group comprising a traction vehicle and a set of driveless passenger carriages coupled thereto.

Figure 2:
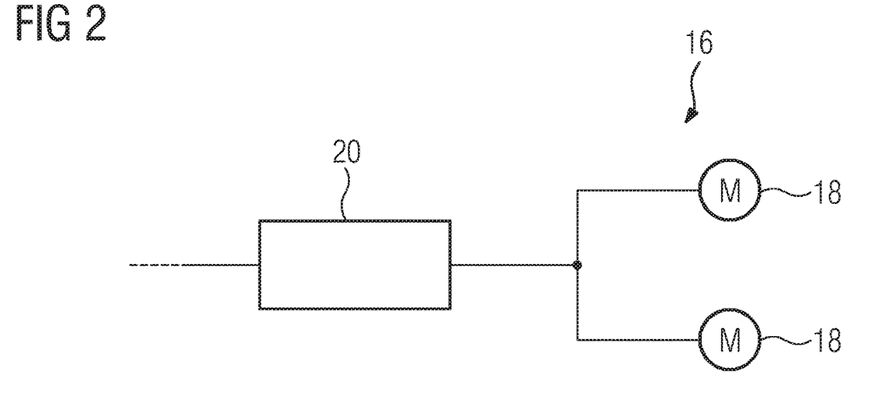
FIG. 2 shows a drive unit of the drive device.

The drive device 15 has a set of drive units 16, which are each associated with a different traction bogie device. The drive units 16 have, as shown in FIG. 2, drive motors 18, which are designed in particular as a three-phase machine and are respectively provided for driving a different drive axle 14. In order to supply the drive motors 18 with electrical power, the drive units 16 also each comprise at least one power supply unit 20 that is operatively connected thereto. This is known from the prior art and has an inverter (not shown), which in a traction mode of the drive unit 16, as a result of the actuation of electronic switching elements—also called "valves"—of an electronic power device, starting from a direct voltage, generates a current variable in voltage and frequency according to the power to be provided for the associated drive motor(s) 18. The energy available for this purpose in an associated direct voltage intermediate circuit is obtained from a high voltage power supply 25. Energy obtained therefrom is led in a traction mode via a current collector, and further electrical conversion devices (not shown), such as in particular a transformer or a voltage transformer, a rectifier, etc. to the drive device 15. In the traction mode of the drive units 16, the switching elements of the inverters are controlled in accordance with a switching strategy to generate a drive torque to the associated drive axles 14 via the drive motors 18.

The rail vehicle 10 also has a braking device 21. This comprises a friction brake unit described in more detail below 22 and an electrical brake unit 24. In a normal braking mode of the braking device 21, a braking operation of the rail vehicle 10 occurs at least by the drive units 16, which in each case have the function of an electrodynamic brake. Therefore, the drive units 16 each form a part of the electrical brake unit 24.

For controlling the friction brake unit 22 and the electrical brake unit 24, the braking device 21 has a brake control device 26. This is illustrated in detail with reference to FIG. 3. In the figure, only one of the drive units 16 is shown, wherein the following description can be applied to the other drive units 16 that are not shown.

Figure 3:
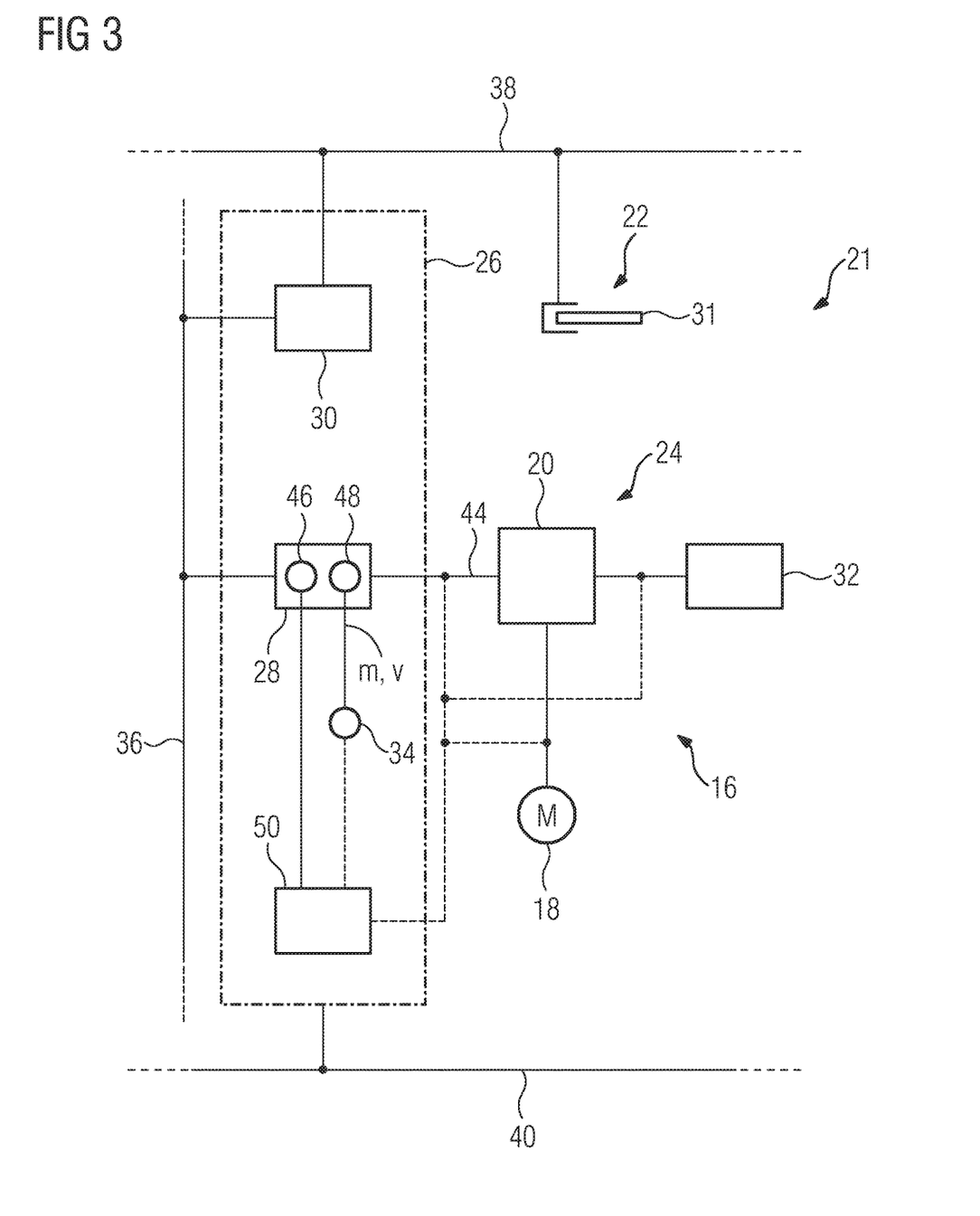
FIG. 3 shows a circuit of the braking device with a brake control device.

The brake control device 26 comprises a brake control unit 28, which in an active state is provided to control the power supply unit 20 of the drive unit 16 for a braking operation of the electrical brake unit 24. For this braking operation, the brake control unit 28 is provided to control the switching elements of the inverter of the power supply unit 20 according to a switching strategy in such a way that a braking torque is generated on the associated drive shaft 14 via an associated drive motor 18. With a braking operation by the electrical brake unit 24, the drive motor 18 acts as a generator, with the energy converted into electrical power during the braking operation being converted by a braking resistor 32 into heat. Alternatively or additionally, the energy can be fed back into the high voltage power supply 25, be used on the vehicle or be stored in a mobile storage facility.

The brake control unit 28 is operatively connected to the power supply unit 20. In addition to an interface for the power supply unit 20, the brake control unit 28 has a further interface through which it is operatively connected to a sensor unit 34. The sensor unit 34 serves to detect a vehicle speed characteristic v and a mass characteristic m, representing input parameters for the generation of control signals 44 by the brake control unit 28.

The brake control device 26 also comprises a brake control unit 30 which is designed to control components of the friction brake unit 22. In particular, during actuation of the friction brake unit 22 it controls—via a rail vehicle main air line 38—actuators, by which a contact between brake components 31 designed as a brake disk (see also FIG. 5) and brake linings is produced.

The brake control device 26, in particular its brake control units 28 and 30, is also operatively connected via interfaces to the rail vehicle control technology, by being connected to a data bus 36 of the rail vehicle 10. Further input parameters for the brake control units 28, 30 can be provided by way of these further interfaces, such as in particular a characteristic that represents a braking effect required by the driver, by an automatic vehicle controller and/or an emergency brake. The brake control device 26 is supplied with electrical energy by an on-board power supply 40.

On the basis of the above input parameters, in a normal braking mode, in which it is in an active state, the brake control unit 28 generates control signals 44, which control the power supply unit 20 in accordance with a particular braking effect to be achieved. For this purpose, the brake control unit 28 has at least one arithmetic unit 46 and a storage unit 48 in which software is stored. Especially the braking mode switching strategy for the switching elements of the inverter is programmed in this software. In a normal braking mode of the braking device 21, the electrical brake unit 24 has a higher priority than the friction brake unit 22, wherein the largest possible part of the braking effect to be achieved is to be generated by the electrical brake unit 24 and the friction brake unit 22 when needed—in particular in a low speed range—serves to support the electrical brake unit 24.

A monitoring device 50 of the braking device 21 is associated with the brake control unit 28 and is provided to monitor the braking effect achieved, or which is achievable, by the electrical brake unit 24. For this purpose, a braking effect characteristic, in particular a braking torque characteristic is used and compared with a desired value. The braking effect characteristic can for example be detected by an acceleration sensor and/or is determined by an evaluation of the speed characteristic v. Alternatively or additionally, the braking effect characteristic can be determined by monitoring the control signals 44 generated by the brake control unit 28. In addition, as shown in the figure, an electrical quantity—for example, an electrical current—of the associated drive motor 18 and/or the power supply unit 20 can be monitored, in particular, be evaluated.

In the normal braking mode of the braking device 21—for example during normal service braking—a desired braking torque is predominantly provided, in particular as far as possible by the electrical brake unit 24. In this normal braking mode, the brake control unit 30, which is operatively connected to the rail vehicle main air line 38, controls the friction brake unit 22, whose function, as described above, includes supporting the electrical brake unit 24—in particular in a low speed range.

If it is detected by the monitoring device 50 that the braking effect generated, or achievable, by the electrical brake unit 24 is not sufficient to provide a desired brake torque, the electrical brake unit 24 is deemed defective and the brake control device 26 activates a safety mode of the friction brake unit 22 in which it compensates for the lack of braking torque, if necessary, generates the total desired braking torque.

The limitation of the electrical brake unit 24 can be due to a fault in a drive unit 16 and/or a brake control unit 28 associated therewith.

Figure 4:
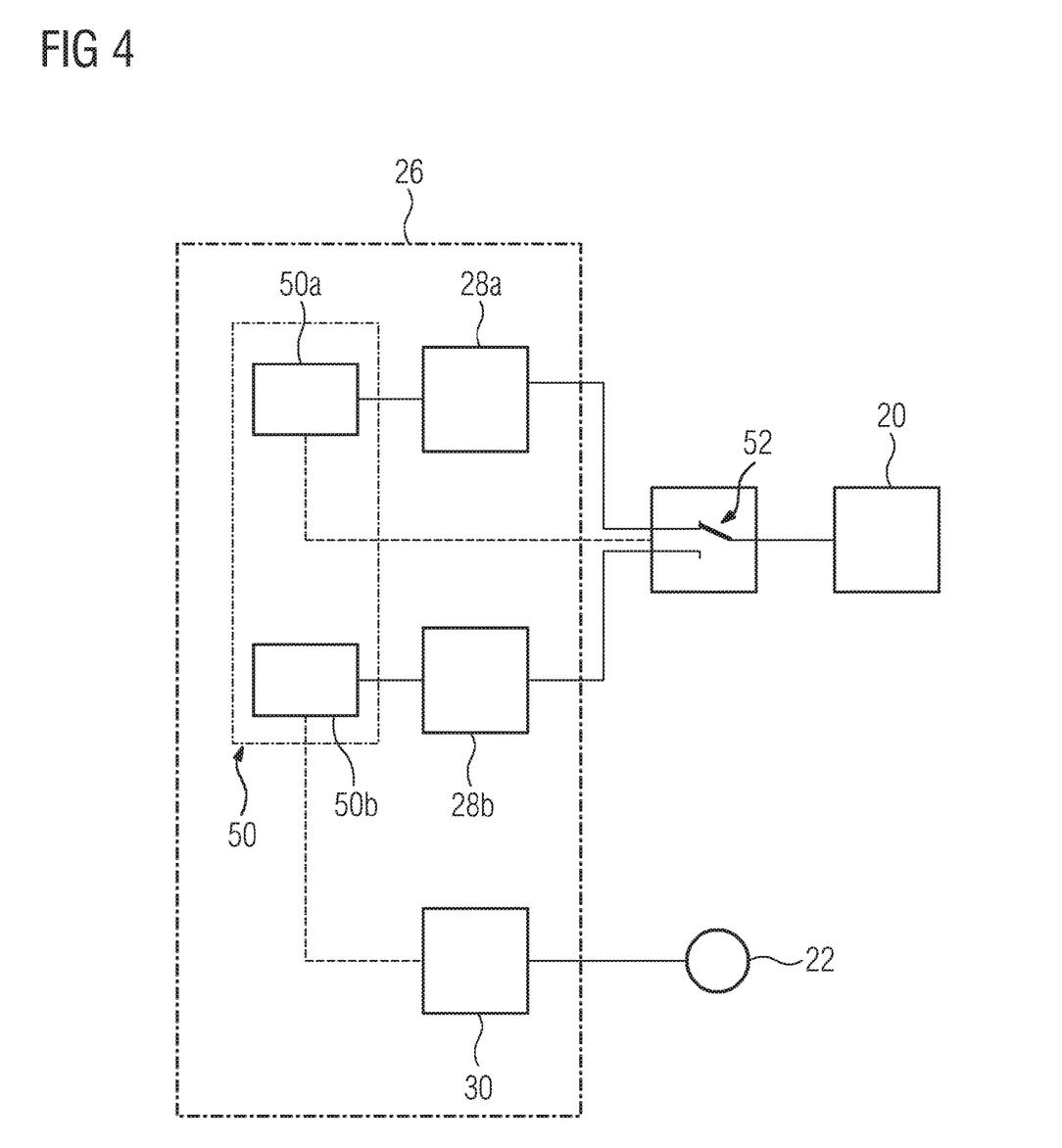
FIG. 4 shows an alternative brake control device with redundant brake control units.

FIG. 4 shows a specific embodiment of the brake control device 26. In this example, it has two brake control units 28a, 28b, which are each provided, as described above, for controlling an identical power supply unit 20 of the drive device 15 for a braking operation of the electrical brake unit 24. The monitoring device 50 has two monitoring units 50a and 50b, which are each provided to monitor a different brake control unit 28a or 28b.

The brake control units 28a, 28b are each connected by a switching unit 52 to the power supply unit 20. This switching unit 52 schematically illustrated in the figure can have a mechanical switch or be implemented as a software solution.

In the normal braking mode, the electrical brake unit 24 is basically controlled by the brake control unit 28a. The brake control unit 28b is in an inactive state due to a corresponding position of the switching unit 52. A braking operation of the electrical brake unit 24 is monitored, as described above, by the monitoring unit 50a. If, as described above, it is found that a desired braking torque intended for the electrical brake unit 24 cannot be provided thereby, the switch unit 52 is actuated by the monitoring unit 50a, so the brake control unit 28a is put in an inactive state and the brake control unit 28b is activated. The electrical brake unit 24 then continues to be controlled by the brake control unit 28b.

A second monitoring unit 50b, different from the first monitoring unit 50a in terms of software and/or hardware, is associated with the brake control unit 28b. This is provided to monitor the braking effect achieved, or which is achievable, by the electrical brake unit 24 with the brake control unit 28b. For this purpose—as already described above—a braking effect characteristic, in particular a brake torque characteristic, is detected or determined, and compared with a desired value.

If it is detected by the second monitoring unit 50b that the braking effect generated, or which is achievable, by the electrical brake unit 24 is not sufficient, the brake control unit 28b is deemed defective and the safety mode of the friction brake unit 22 is activated as described above.

The brake control units 28a, 28b are designed to be diversely redundant to each other. They are based on differing technologies. A technology encompasses the structural—or hardware-related—and/or algorithmic—or software-related—design. In an exemplary configuration, the first brake control unit 28 can be in the form of a signal processor, with the algorithmic implementation corresponding to a field-oriented control. The brake control unit 28b can be designed as a field-programmable gate array (FPGA) or as an "in the field programmable gate array", with the algorithmic implementation corresponding to a switching-oriented control.

Figure 5:
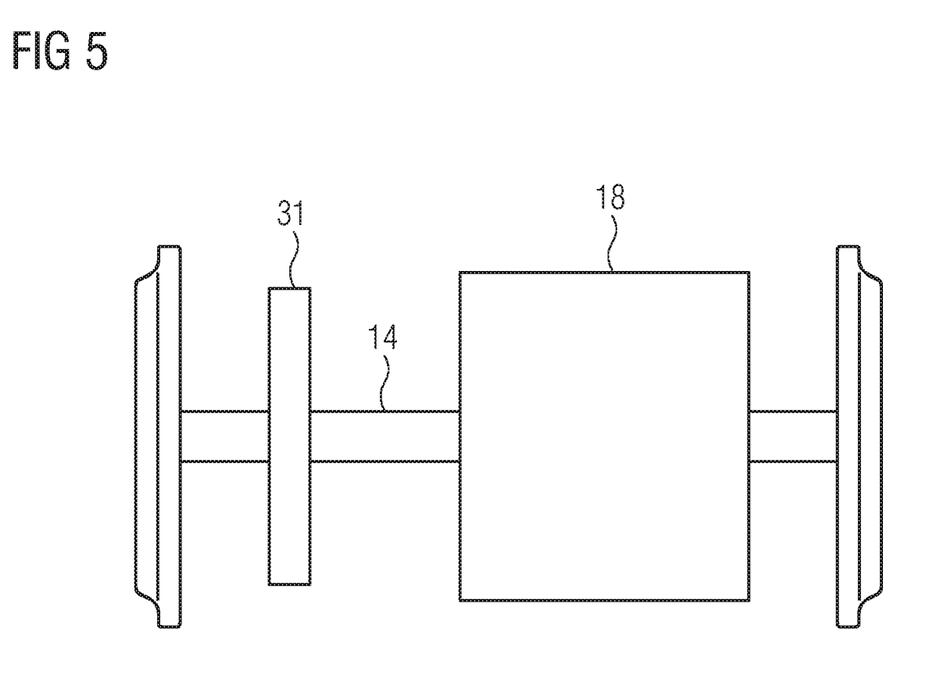
FIG. 5 shows a drive axle of the rail vehicle with a motor and a brake disk in a plan view and FIG. 6 shows a chassis of a motor vehicle in a plan view.

FIG. 5 shows a drive axle 14, its associated drive motor 18 and a brake component 31 of the frictional braking unit 22. This is designed as a brake disk, which is made of a composite material. In particular, the brake component 31 is designed as a ceramic brake disk made of a C/C-SiC carbon fiber composite material. In the above-described normal braking mode of the braking device 21, the friction brake unit 22 is relieved by the electrical brake unit 24 until it does not exceed the corresponding oxidation temperature limit—in the range of about 300° C. to 500° C. for the material selected. If the safety mode of the friction brake unit 22 is activated, the braking components 31 can handle the corresponding overload very well since they are designed for damage-free operation up to temperatures of over 800° C., preferably up to 1,300° C., in other words, are overload resistant.

The considered embodiment of a rail vehicle is exemplary. In alternative embodiments, vehicles are conceivable which are not mounted on rails, such as, for example, a car, a bus or a truck.

Figure 6:
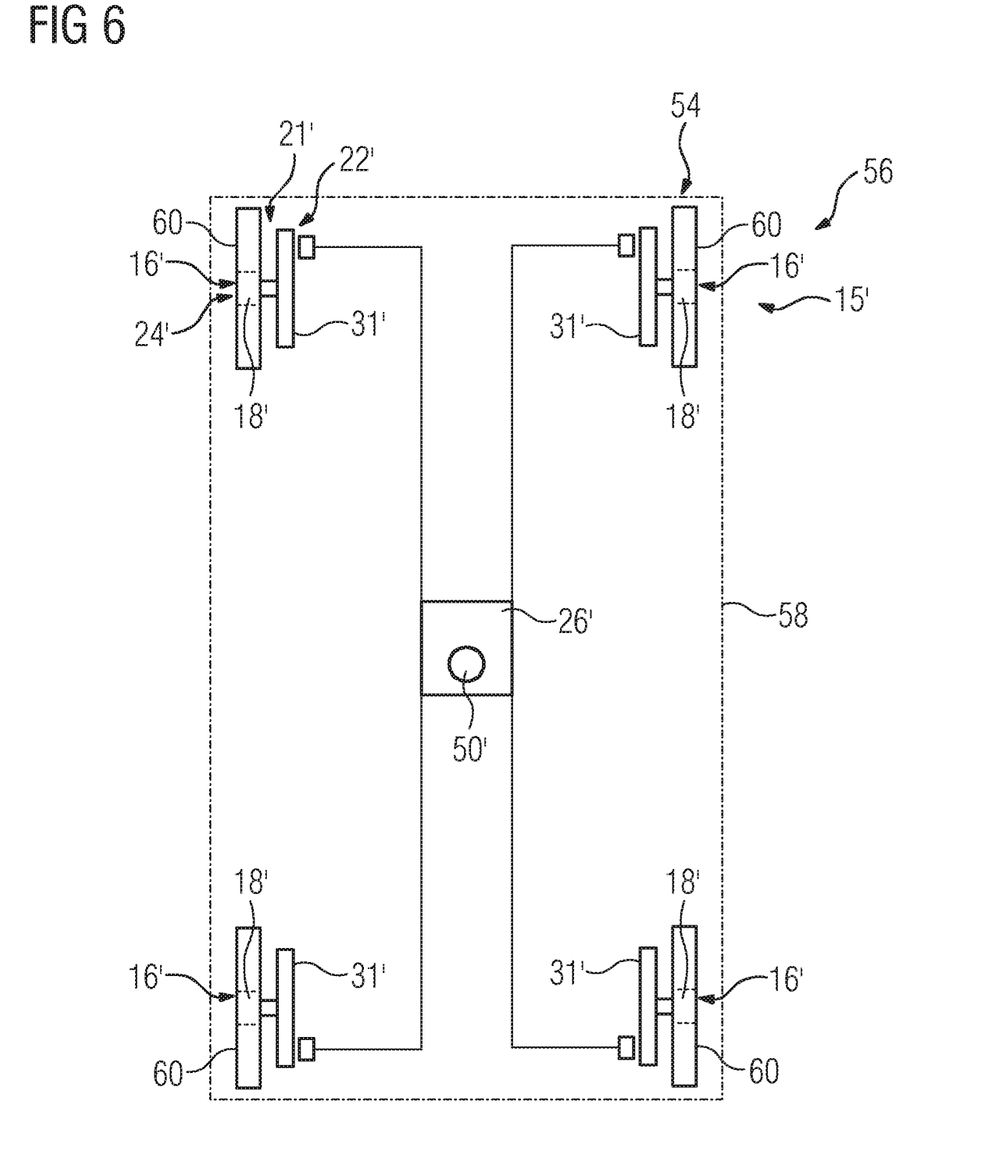

FIG. 6 shows in a highly schematic plan view a chassis 54 of a motor vehicle 56. This is designed in particular as a passenger vehicle (car), with a design as a truck or bus also being conceivable. An outer contour 58 of the motor vehicle 56 is shown in broken lines and schematically.

The chassis 54 has a set of driving wheel units, which are each designed as drivable vehicle wheels 60. The vehicle wheels 60 are mechanically independent of one another and form, in particular, autonomous drivable units. A drive unit 16' of the drive device 15' of the motor vehicle 56 is in each case associated with the vehicle wheels 60. The drive units 16' each have a drive motor 18' designed as a wheel hub drive. Reference is made to the above description of the drive units 16, which can be applied mutatis mutandis to the drive units 16', in relation to the design and operation of the drive units 16'. The drive units 16' also form components of an electrical brake unit 24'.

At least one braking component 31' of a friction brake unit 22' respectively is also associated with the vehicle wheels 60. The braking components 31' are designed as brake discs, which are made of a composite material.

The electrical brake unit 24' and the friction brake unit 22' are components of a braking device 21' of the motor vehicle 56, further having for control thereof a brake control device 26' comprising a monitoring device 50'. The above description of the braking device 21, in particular in relation to its electrical brake unit 24, friction brake unit 22 and brake control device 26 with the monitoring device 50 can be applied mutatis mutandis to the corresponding units in the present exemplary embodiment, with unnecessary repetition being omitted.

The exemplary embodiment of FIG. 6 can also be applied in rail vehicles, for example in trams.

The invention claimed is:
1. A vehicle, comprising:
a braking device having a friction brake unit, an electrical brake unit and a brake control device;
said friction brake unit including brake components made of a composite material; and
said brake control device having a monitoring device configured for monitoring a braking operation performed by said electrical brake unit;

said brake control device being configured, in a normal mode of operation, to effect braking primarily by way of the electrical brake unit;

said brake control device being configured, in a case in which said monitoring device detects a limitation of said electrical brake unit, to trigger a safety mode and to effect braking primarily by way of said friction brake unit; and wherein said brake components of said friction brake unit are configured not to exceed an oxidation limit temperature of said composite material in the normal mode of operation and to enable operation in the safety mode within a temperature range above the oxidation limit temperature.

2. The vehicle according to claim 1, which comprises a drive device, and wherein said electrical brake unit includes at least one drive unit of said drive device.

3. The vehicle according to claim 2, wherein at least one of said brake components of said friction brake unit and a drive unit of said drive device are associated with a respective one of a plurality of vehicle wheels, and wherein said drive unit is a component of said electrical brake unit.

4. The vehicle according to claim 1, wherein said brake control device has at least two brake control units for controlling said electrical brake unit, and wherein said at least two brake control units are redundant to each other or diversely redundant in design.

5. The vehicle according to claim 1, wherein said brake control device has at least two brake control units for controlling said electrical brake unit and said monitoring device comprises at least two monitoring units, which are different from each other and are each associated with a different brake control unit.

6. The vehicle according to claim 1, wherein said brake control device is configured to control said friction brake unit for a braking effect compensation in a case in which said monitoring device detects that a braking effect of said electrical brake unit is insufficient with respect to a desired braking effect.

7. The vehicle according to claim 1, wherein said composite material is a fiber composite material.

8. The vehicle according to claim 7, wherein said composite material is a carbon fiber composite material.

9. The vehicle according to claim 1, wherein said composite material is a ceramic composite material.

10. The vehicle according to claim 1, wherein said composite material has an oxidation limit temperature in a range from 300 to 500 C.

11. The vehicle according to claim 1, wherein said composite material is configured for damage-free operation up to temperatures in a range from 800 to 1,400° C.

12. The vehicle according to claim 1 configured as a motor vehicle.

13. The vehicle according to claim 1 configured as a rail vehicle.

14. The vehicle according to claim 13, being a multiple unit for high-speed traffic with a maximum operating speed of at least 350 km/h.

15. A method of operating a braking device of a vehicle, the braking device having a friction brake unit with brake components made of a composite material, an electrical brake unit and a brake control device, the method comprising:

in a normal braking mode, primarily braking the vehicle with the electrical brake unit;

monitoring a braking operation performed by the electrical brake unit with a monitoring device;

if the monitoring unit detects a limitation of the electrical brake unit, activating a safety braking mode for primarily braking the vehicle with the friction brake unit;

in the normal braking mode, selectively assisting a braking operation of the electrical brake unit with the friction brake unit and thereby operating the friction brake unit at temperatures below an oxidation limit temperature of the composite material of the brake components; and in the safety braking mode, primarily braking the vehicle with the friction brake unit and, on occasion, operating the friction brake unit at operating temperatures above the oxidation limit temperature of the composite material.

16. The method according to claim 15, wherein the normal mode encompasses a service braking operation and the safety mode encompasses an emergency braking operation.

* * * * *